United States Patent
Nishikawa (10) Patent No.: US 6,841,959 B2
(45) Date of Patent: Jan. 11, 2005

(54) MOTOR ROTATION RATE DETECTING CIRCUIT AND MOTOR DRIVING DEVICE

(75) Inventor: Koji Nishikawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1 day.

(21) Appl. No.: 10/610,753

(22) Filed: Jul. 2, 2003

(65) Prior Publication Data

US 2004/0007996 A1 Jan. 15, 2004

(30) Foreign Application Priority Data

Jul. 8, 2002 (JP) ........................................ 2002-198997

(51) Int. Cl.$^7$ .............................................. H02P 7/00
(52) U.S. Cl. ...................................................... 318/268
(58) Field of Search ................................ 318/268, 254, 318/138, 439

(56) References Cited

U.S. PATENT DOCUMENTS 5,475,210 A * 12/1995 Taguchi et al. ............. 250/205

2003/0126927 A1 * 7/2003 Nozoe et al. ............ 73/514.16

FOREIGN PATENT DOCUMENTS

| JP | 57-076456 | 5/1982 |
| JP | 09-127140 | 5/1997 |

* cited by examiner

Primary Examiner—Karen Masih
(74) Attorney, Agent, or Firm—Arent Fox PLLC (57) ABSTRACT

In a motor rotation rate detecting circuit incorporating a conventional differentiating circuit, raising the upper limit of the differentiating operation frequency of the differentiating circuit to cope with an increased range of the motor rotation rate causes the differentiating circuit to amplify high-frequency noise when the motor is rotating at a low rate. To solve this problem, a motor rotation rate detecting circuit embodying the invention incorporates a differentiating circuit that produces a rotation rate detection signal by differentiating a plurality of alternating signals having different phases that are output according to the rotation position of the motor, and the frequency response of the differentiating operation of the differentiating circuit is switchable according to the voltage of the rotation rate detection signal.

18 Claims, 7 Drawing Sheets

MOTOR ROTATION RATE DETECTING CIRCUIT AND MOTOR DRIVING DEVICE

BACKGROUND OF THE INVENTION

1. Field of the Invention

The present invention relates to a motor rotation rate detecting circuit that produces a rotation rate detection signal by differentiating a plurality of alternating signals having different phases that are output according to the rotation position of a motor. The present invention also relates to a motor driving device incorporating such a motor rotation rate detecting circuit.

2. Description of the Prior Art

Japanese Patent Applications Laid-Open Nos. H9-127140 and S57-76456 disclose conventionally known examples of motor rotation rate detecting circuits that produce a rotation rate detection signal by differentiating two-phase sinusoidal signals output from an encoder coupled to a motor.

The motor rotation rate detecting circuit disclosed in Japanese Patent Application Laid-Open No. H9-127140 includes an inverting circuit that inverts the polarities of two-phase sinusoidal signals output from an encoder coupled to a motor, a switching circuit that selects one among the four sinusoidal signals, namely the two-phase sinusoidal signals output from the encoder coupled to the motor and their respective inverted signals, a differentiating circuit that differentiates the signal output from the switching circuit, a logic selecting circuit that controls the timing of the switching performed by the switching circuit, and a differentiation error eliminating circuit that eliminates a differentiation error component from the differentiated signal output from the differentiating circuit to output a rotation rate detection signal.

Differentiating circuits of various configurations can be used in a motor rotation rate detecting circuit. However, a signal having a frequency higher than that corresponding to the maximum motor rotation rate is a high-frequency noise signal, and therefore it is customary to use a differentiating circuit that does not perform differentiating operation on a signal having a frequency higher than that corresponding to the maximum motor rotation rate.

Figure 12:
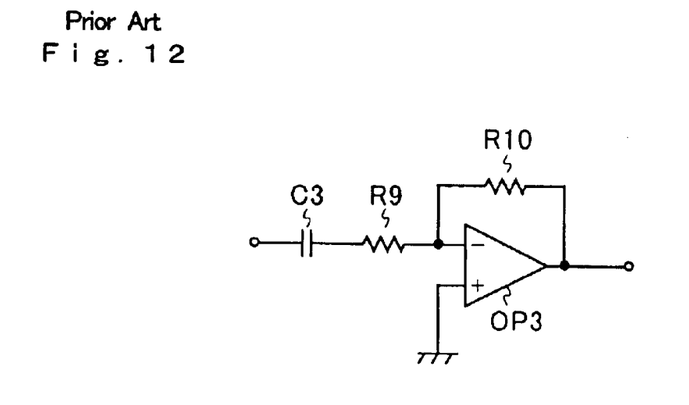
FIG. 12 is a diagram showing an example of the configuration of the differentiating circuit provided in a conventional motor rotation rate detecting circuit.

FIG. 12 shows an example of the configuration of a differentiating circuit that does not perform differentiating operation on a signal having a frequency higher than that corresponding to the maximum motor rotation rate. The differentiating circuit shown in FIG. 12 is composed of a capacitor C3, resistors R9 and R10, and an operational amplifier OP3. One end of the capacitor C3 serves as the input end of the differentiating circuit. The other end of the capacitor C3 is connected through the resistor R9 to the inverting input terminal of the operational amplifier OP3. The non-inverting input terminal of the operational amplifier OP3 is grounded. The operational amplifier OP3 receives negative feedback through the resistor R10. The node at which the output terminal of the operational amplifier OP3 and the resistor R10 are connected together serves as the output end of the differentiating circuit. Here, let the capacitance of the capacitor C3 be $C_3$ [F] and the resistance of the resistor R10 be $R_{10}$ [Ω]. Then, the differentiating operation frequency of the differentiating circuit shown in FIG. 12 is lower than $1/(2 \times \pi \times C_3 \times R_{10})$ [Hz]. The differentiating operation frequency denotes the frequency at which the differentiating circuit offers differentiating operation. Accordingly, the capacitance $C_3$ and the resistance $R_{10}$ are so determined that the maximum value of the differentiating operation frequency is equal to the frequency corresponding to the maximum motor rotation rate.

The motor rotation rate detecting circuit described above is used to detect the rotation rate of various types of motor. For example, it is used to detect the rotation rate of a spindle motor used in an optical disk apparatus.

In an optical disk apparatus, as the disk rotation rate becomes increasingly high, the range of the frequency of the output signal of the encoder coupled to the spindle motor becomes increasingly wide. As the range of the frequency of the output signal of the encoder becomes wider, the maximum value of the differentiating operation frequency of the differentiating circuit shown in FIG. 12 needs to be made higher.

However, raising the maximum value of the differentiating operation frequency of the differentiating circuit causes the differentiating circuit to perform differentiating operation on signals in a high-frequency range even when such signals are not needed because the motor is rotating at a low rate. As a result, when the motor is rotating at a low rate, quite inconveniently, the differentiating circuit amplifies high-frequency noise.

SUMMARY OF THE INVENTION

An object of the present invention is to provide a motor rotation rate detecting circuit that is capable of wide-range detection with satisfactory resistance to high-frequency noise, and to provide a motor driving device incorporating such a motor rotation rate detecting circuit.

To achieve the above object, according to the present invention, a motor rotation rate detecting circuit is provided with a differentiating circuit that produces a rotation rate detection signal by differentiating a plurality of alternating signals having different phases that are output according to the rotation position of a motor, and the frequency response of the differentiating operation of the differentiating circuit is switchable according to the voltage of the rotation rate detection signal.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
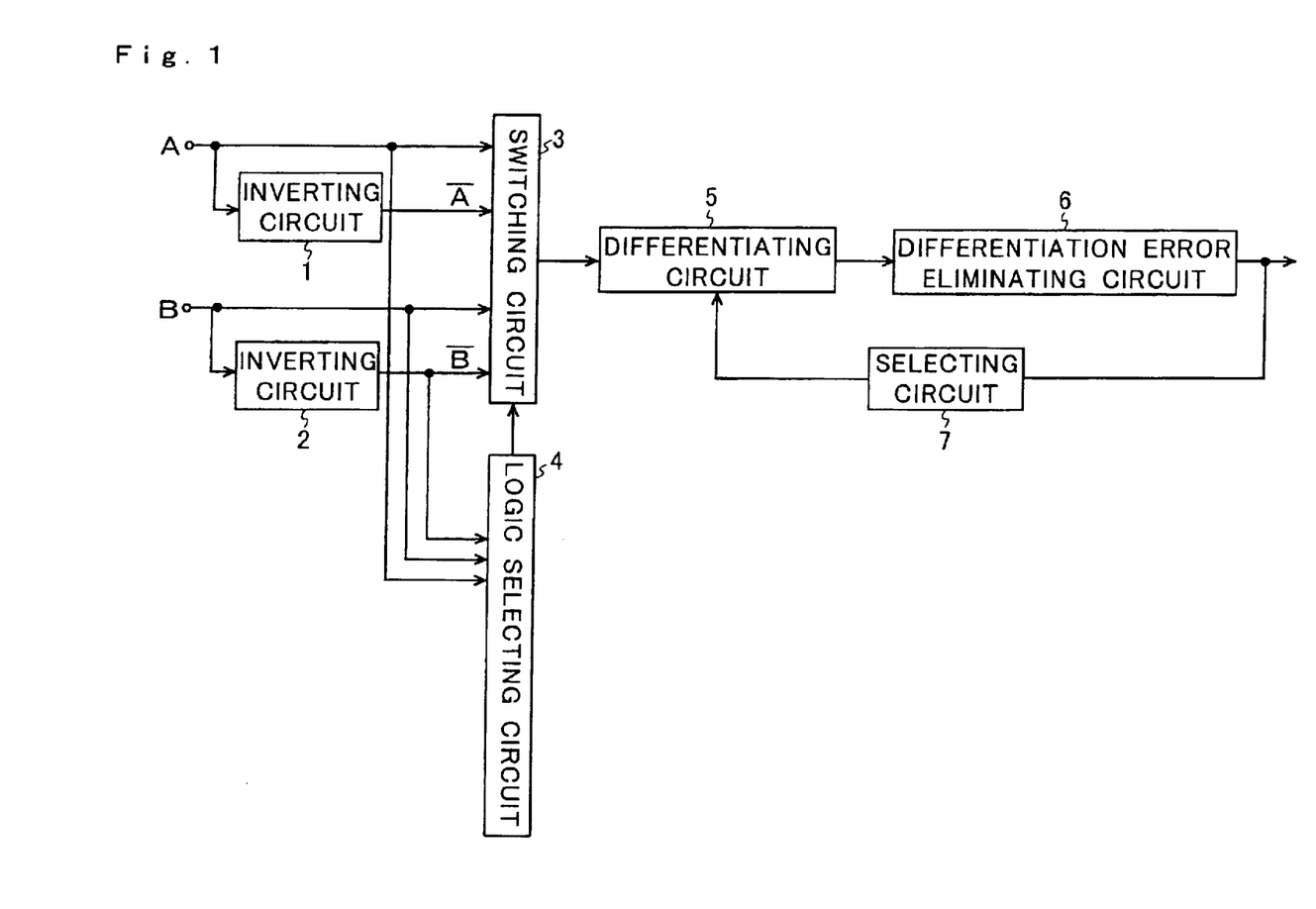
FIG. 1 is a diagram showing an example of the configuration of a motor rotation rate detecting circuit embodying the invention.

Hereinafter, embodiments of the present invention will be described with reference to the drawings. FIG. 1 shows an example of a motor rotation rate detecting circuit embodying the invention. The motor rotation rate detecting circuit shown in FIG. 1 is fed with two-phase sinusoidal signals A and B 90° out of phase with each other that are output from hole elements or the like provided in a motor or from an encoder coupled to a motor.

The sinusoidal signal A is fed to an inverting circuit 1, which inverts the polarity of the sinusoidal signal A and outputs a sinusoidal signal A overscored. The sinusoidal signal B is fed to an inverting circuit 2, which inverts the polarity of the sinusoidal signal B and outputs a sinusoidal signal B overscored.

The four sinusoidal signals, namely A, B, A overscored, and B overscored, are fed to a switching circuit 3, which selects one among those four signals and feeds it to a differentiating circuit 5. Three of the sinusoidal signals, namely A, B, and B overscored, are fed to a logic selecting circuit 4, which controls the timing of the switching performed by the switching circuit.

The differentiating circuit 5 differentiates the signal output from the switching circuit 3, and feeds the differentiated signal to a differentiation error eliminating circuit 6. The differentiation error eliminating circuit 6 eliminates a differentiation error component from the differentiated signal output from the differentiating circuit 5, and outputs a rotation rate detection signal. According to the rotation rate detection signal output from the differentiation error eliminating circuit 6, a selecting circuit 7 turns on and off an analog switch (not shown) provided within the differentiating circuit 5.

Figure 2:
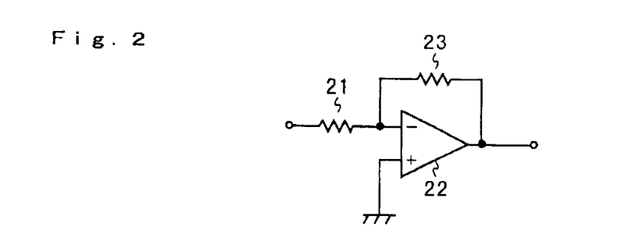
FIG. 2 is a diagram showing an example of the configuration of the inverting circuit provided in the motor rotation rate detecting circuit of FIG. 1.

FIG. 2 shows an example of the configuration of the inverting circuits 1 and 2. The inverting circuit shown in FIG. 2 is composed of resistors 21 and 23 and an operational amplifier 22. One end of the resistor 21 serves as an input end of the inverting circuit. The other end of the resistor 21 is connected to the inverting input terminal of the operational amplifier 22. The non-inverting input terminal of the operational amplifier 22 is grounded. The operational amplifier 22 receives negative feedback through the resistor 23. The node at which the operational amplifier 22 and the resistor 23 are connected together serves as the output end of the inverting circuit.

Figure 3:
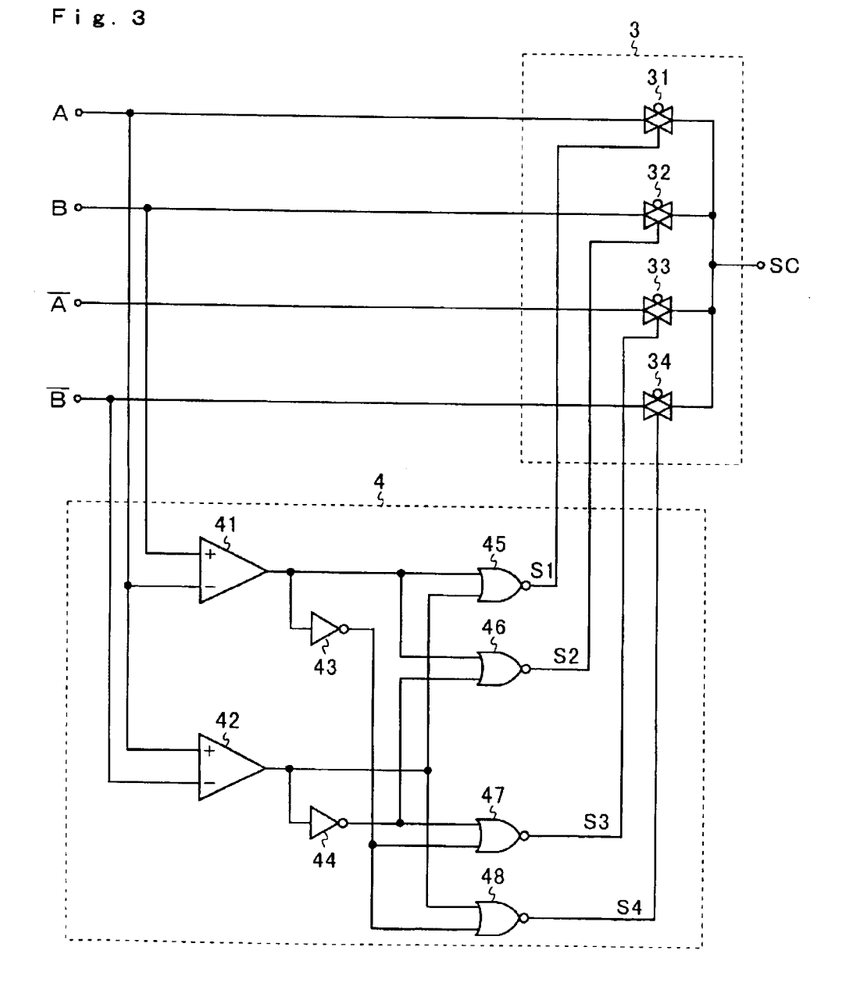
FIG. 3 is a diagram showing an example of the configuration of the switching circuit and the logic selecting circuit provided in the motor rotation rate detecting circuit of FIG. 1.

FIG. 3 shows an example of the configuration of the switching circuit 3 and the logic selecting circuit 4. The switching circuit 3 is composed of analog switches 31 to 34.

The analog switch 31 receives at one end thereof the sinusoidal signal A, the analog switch 32 receives at one end thereof the sinusoidal signal B, the analog switch 33 receives at one end thereof the sinusoidal signal A overscored, and the analog switch 34 receives at one end thereof the sinusoidal signal B overscored. The analog switches 31 to 34 are at the other end thereof connected together to serve as the output end of the switching circuit 3. The switching circuit 3 outputs at the output end thereof a signal SC.

The logic selecting circuit 4 is composed of operational amplifiers 41 and 42, inverter circuits 43 and 44, and NOR circuits 45 to 48. The operational amplifier 41 receives at the non-inverting input terminal thereof the sinusoidal signal B, and receives at the inverting input terminal thereof the sinusoidal signal A. The operational amplifier 41 outputs a rectangular signal that is high when the sinusoidal signal B is greater than the sinusoidal signal A and low when the sinusoidal signal B is not greater than the sinusoidal signal A. The operational amplifier 42 receives at the non-inverting input terminal thereof the sinusoidal signal A, and receives at the inverting input terminal thereof the sinusoidal signal B overscored. The operational amplifier 42 outputs a rectangular signal that is high when the sinusoidal signal A is greater than the sinusoidal signal B overscored and low when the sinusoidal signal A is not greater than the sinusoidal signal B overscored.

The rectangular signal output from the operational amplifier 41 is fed to the inverter circuit 43, which inverts and outputs the signal. The rectangular signal output from the operational amplifier 42 is fed to the inverter circuit 44, which inverts and outputs the signal.

The NOR circuit 45 receives the output signal of the operational amplifier 41 and the output signal of the operational amplifier 42, and feeds a signal S1 obtained by inverting the OR of those two signals to the control terminal of the analog switch 31 provided in the switching circuit 3. The NOR circuit 46 receives the output signal of the operational amplifier 41 and the output signal of the inverter circuit 44, and feeds a signal S2 obtained by inverting the OR of those two signals to the control terminal of the analog switch 32 provided in the switching circuit 3. The NOR circuit 47 receives the output signal of the inverter circuit 43 and the output signal of the inverter circuit 44, and feeds a signal S3 obtained by inverting the OR of those two signals to the control terminal of the analog switch 33 provided in the switching circuit 3. The NOR circuit 48 receives the output signal of the operational amplifier 42 and the output signal of the inverter circuit 43, and feeds a signal S4 obtained by inverting the OR of those two signals to the control terminal of the analog switch 34 provided in the switching circuit 3.

Figure 4:
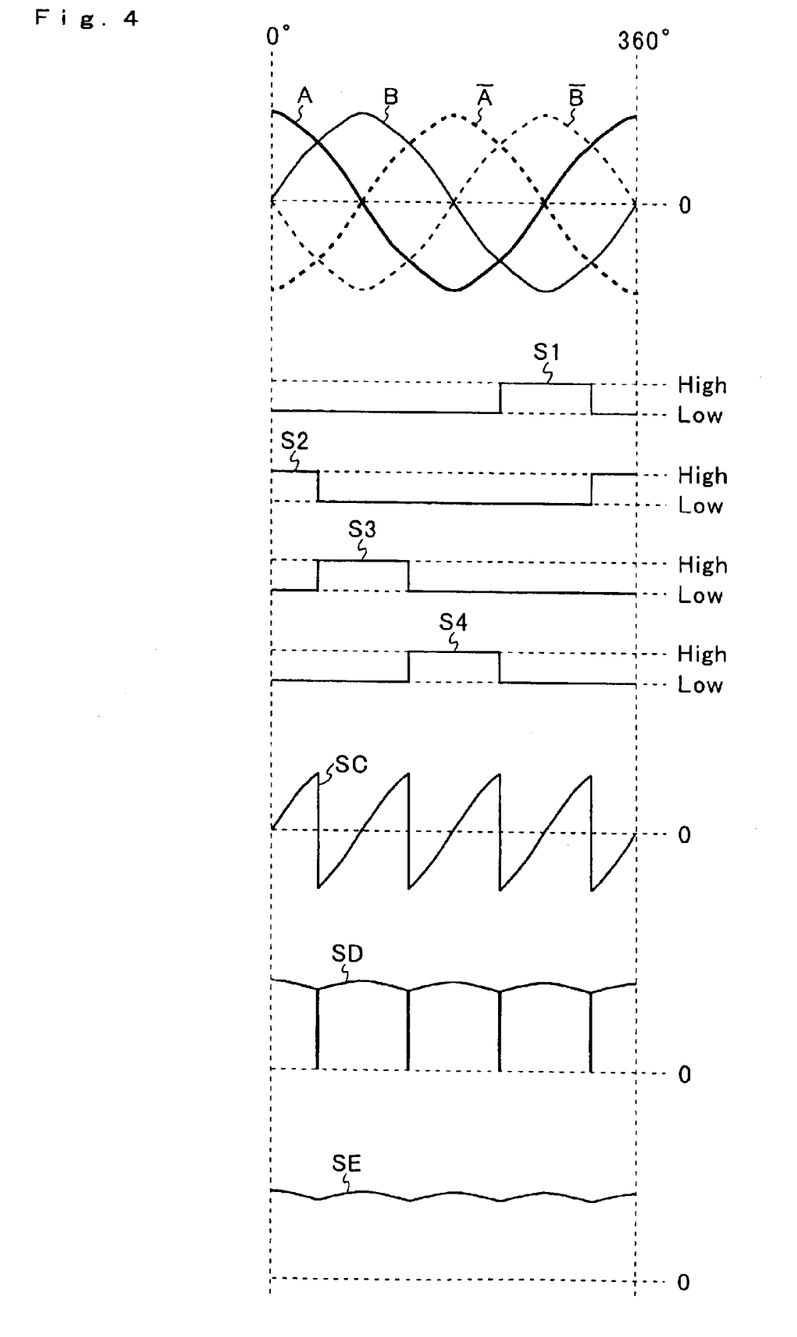
FIG. 4 is a diagram showing the waveforms of the signals observed at relevant points in the motor rotation rate detecting circuit of FIG. 1.

Configured as described above, the logic selecting circuit 4 produces control signals S1 to S4 as shown in FIG. 4. Accordingly, the signal SC output from the switching circuit 3 has a waveform as shown in FIG. 4 which is a combination of the waveform of that portion of each of the sinusoidal signals A, B, A overscored, and B overscored which extends from 45° before to 45° after their respective rising zero-cross point.

The differentiating circuit 5 differentiates the signal SC, and outputs a differentiated signal SD that has a waveform as shown in FIG. 4. The differentiation error eliminating circuit 6 eliminates a differentiation error component from the differentiated signal SD output from the differentiating circuit 5, and outputs a rotation rate detection signal SE. The voltage of the differentiated signal SD is proportional to the angular velocity of the sinusoidal signals A and B, and this makes it possible to detect the motor rotation rate on the basis of the voltage of the rotation rate detection signal SE.

Figure 5:
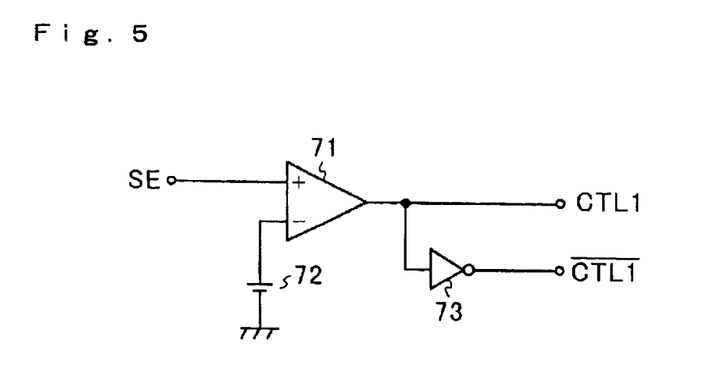
FIG. 5 is a diagram showing an example of the configuration of the selecting circuit provided in the motor rotation rate detecting circuit of FIG. 1.

Next, the differentiating circuit 5 and the selecting circuit 7, which characterize the present invention, will be described in more detail. FIG. 5 shows an example of the configuration of the selecting circuit 7. The selecting circuit shown in FIG. 5 is composed of an operational amplifier 71, a constant voltage source 72, and an inverter circuit 73. The non-inverting input terminal of the operational amplifier 71 is connected to the output end of the differentiation error eliminating circuit 6 (see FIG. 1) so as to receive the rotation rate detection signal SE. The inverting input terminal of the operational amplifier 71 is connected to the positive side of the constant voltage source 72 so as to receive a constant voltage. The negative side of the constant voltage source 72 is grounded.

The output terminal of the operational amplifier 71 is connected to the differentiating circuit 5 (see FIG. 1) so as to feed the differentiating circuit 5 with a control signal CTL1 that is high when the rotation rate detection signal SE is greater than the constant voltage and low when the rotation rate detection signal SE is not greater than the constant voltage. The output terminal of the operational amplifier 71 is also connected to the input terminal of the inverter circuit 73. The output terminal of the inverter circuit 73 is connected to the differentiating circuit 5 (see FIG. 1) so as to feed the differentiating circuit 5 with a control signal CTL1 overscored, which is the inversion of the control signal CTL1. That is, the selecting circuit 7 feeds the differentiating circuit 5 with the control signals CTL1 and CTL1 overscored. The control signal CTL1 is high when the motor rotation rate is equal to or higher than a predetermined value and low when the motor rotation rate is lower than the predetermined value.

Figure 6:
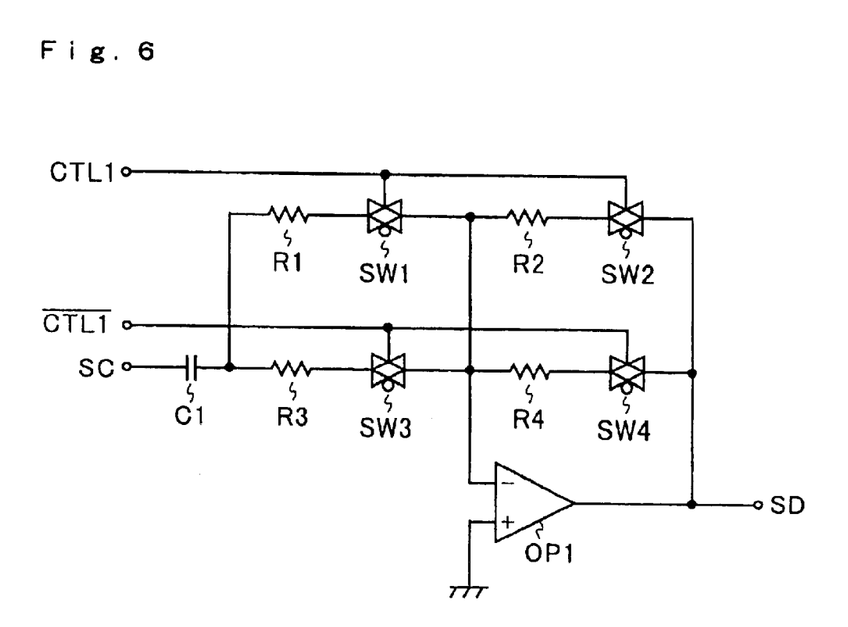
FIG. 6 is a diagram showing an example of the configuration of the differentiating circuit provided in the motor rotation rate detecting circuit of FIG. 1.

FIG. 6 shows an example of the configuration of the differentiating circuit 5. The differentiating circuit shown in FIG. 6 is composed of a capacitor C1, resistors R1 to R4, analog switches SW1 to SW4, and an operational amplifier OP1. One end of the capacitor C1 serves as the input end of the differentiating circuit. The other end of the capacitor C1 is connected to one end of the resistor R1 and to one end of the resistor R3. The other end of the resistor R1 is connected through the analog switch SW1 to the inverting input terminal of the operational amplifier OP1, and the other end of the resistor R3 is connected through the analog switch SW3 to the inverting input terminal of the operational amplifier OP1.

Also connected to the inverting input terminal of the operational amplifier OP1 are one end of the resistor R2 and one end of the resistor R4. The other end of the resistor R2 is connected through the analog switch SW2 to the output terminal of the operational amplifier OP1, and the other end of the resistor R4 is connected through the analog switch SW4 to the output terminal of the operational amplifier OP1. The non-inverting input terminal of the operational amplifier OP1 is grounded. The node at which the output terminal of the operational amplifier OP1 and the analog switches SW2 and SW4 are connected together serves as the output end of the differentiating circuit.

The analog switches SW1 and SW2 are controlled by the control signal CTL1 (see FIG. 5) output from the selecting circuit 7, and the analog switches SW3 and SW4 are controlled by the control signal CTL1 overscored (see FIG. 5) output from the selecting circuit 7.

Now, the operation of the differentiating circuit configured as described above will be described. First, how it operates when the motor rotation rate is lower than a predetermined value will be described. When the motor rotation rate is lower then a predetermined value, the control signal CTL1 is low, and the control signal CTL1 overscored is high. Accordingly, the analog switches SW1 and SW2 are off, and the analog switches SW3 and SW4 are on. Thus, let the capacitance of the capacitor C1 be $C_1$ [F], the resistance of the resistor R3 be $R_3$ [Ω], and the resistance of the analog switch SW3 when it is on (hereinafter referred to as the on-state resistance) be $R_{SW3}$ [Ω]. Then, the differentiating operation frequency of the differentiating circuit shown in FIG. 6 is lower than $1/(2 \times \pi \times C_1 \times (R_3 + R_{SW3}))$ [Hz]. Moreover, let the resistance of the resistor R4 be $R_4$ [Ω] and the on-state resistance of the analog switch SW4 be $R_{SW4}$ [Ω]. Then, the alternative-current gain of the differentiating circuit shown in FIG. 6 is $(R_4 + R_{SW4})/(R_3 + R_{SW3})$.

Next, how the differentiating circuit operates when the motor rotation rate is equal to or higher than a predetermined value will be described. In this case, the control signal CTL1 is high, and the control signal CTL1 overscored is low. Accordingly, the analog switches SW1 and SW2 are on, and the analog switches SW3 and SW4 are off. Thus, let the resistance of the resistor R1 be $R_1$ [Ω] and the on-state resistance of the analog switch SW1 be $R_{SW1}$ [Ω]. Then, the differentiating operation frequency of the differentiating circuit shown in FIG. 6 is lower than $1/(2 \times \pi \times C_1 \times (R_1 + R_{SW1}))$ [Hz]. Moreover, let the resistance of the resistor R2 be $R_2$ [Ω] and the on-state resistance of the analog switch SW2 be $R_{SW2}$ [Ω]. Then, the alternative-current gain of the differentiating circuit shown in FIG. 6 is $(R_2 + R_{SW2})/(R_1 + R_{SW1})$.

Here, the resistances $R_1$ and $R_3$ of the resistors R1 and R3 are so set as to fulfill $R_1 < R_3$. Thus, when the motor rotation speed is lower than the predetermined value, the maximum value of the differentiating operation frequency is small, and, when the motor rotation speed is equal to or higher than the predetermined value, the maximum value of the differentiating operation frequency is great. This prevents the differentiating circuit from amplifying high-frequency noise when the motor is rotating at a low rate, but nevertheless permits the motor rotation rate to be detected when the motor is rotating at a high rate. In this way, it is possible to realize a motor rotation rate detesting circuit that is capable of wide-range detection with satisfactory resistance to high-frequency noise.

Moreover, the resistances $R_1$ to $R_4$ of the resistors R1 to R4 and the on-state resistances $R_{SW1}$ to $R_{SW4}$ of the analog switches SW1 to SW4 are so set as to fulfill $(R_4 + R_{SW4})/(R_3 + R_{SW3}) = (R_2 + R_{SW2})/(R_1 + R_{SW1})$. This makes it possible keep the alternating-current gain constant irrespective of the motor rotation rate. Thus, the gain of the rotation rate detection signal SE remains constant irrespective of the motor rotation rate, and this saves the motor driving circuit, i.e., the circuit that controls the motor according to the rotation rate detection signal SE output from the motor rotation rate detecting circuit, from performing extra operation in addition to the operation it conventionally performs.

Incidentally, in a case where the on-state resistances $R_{SW1}$ to $R_{SW4}$ of the analog switches SW1 to SW4 are made extremely low relative to the resistances $R_1$ to $R_4$ of the resistors R1 to R4 as by the use of analog switches with low on-state resistances, the differentiating operation frequency and the alternating-current gain can be calculated accurately even if the terms in the respective formulae which relate to the on-state resistances of the analog switches are omitted.

FIGS. 7 to 11 show other examples of the configuration of the differentiating circuit 5. With any of these differentiating circuits, the resistances of the resistors and the on-state resistances of the analog switches are so set that, when the motor rotation rate is lower than a predetermined value, the maximum value of the differentiating operation frequency is small and that, when the motor rotation rate is equal to or higher than the predetermined value, the maximum value of the differentiating operation frequency is great. Moreover, the resistances of the resistors and the on-state resistances of the analog switches are so set that the alternating-current gain remains constant irrespective of the motor rotation rate. In a case where the on-state resistances of the analog switches are made extremely low relative to the resistances of the resistor as by the use of analog switches with low on-state resistances, the on-state resistances of the analog switches may be ignored.

Figure 7:
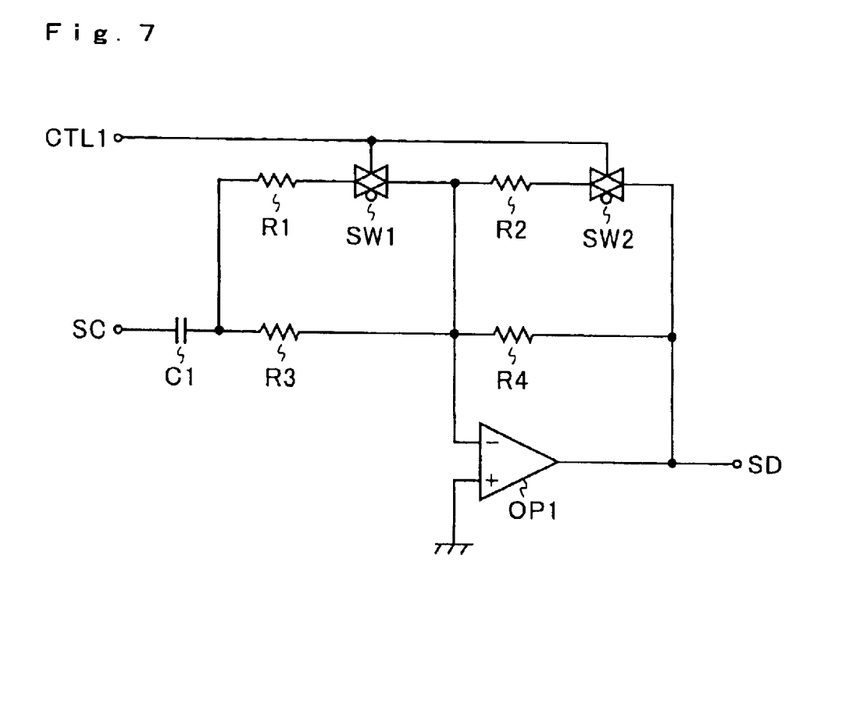
FIG. 7 is a diagram showing another example of the configuration of the differentiating circuit provided in the motor rotation rate detecting circuit of FIG. 1.

Now, the configuration of the differentiating circuit shown in FIG. 7 will be described. Here, such circuit elements as are found also in the differentiating circuit shown in FIG. 6 are identified with the same reference numerals and symbols, and their detailed explanations will not be repeated. In the differentiating circuit shown in FIG. 7, the analog switches SW3 and SW4 used in the differentiating circuit shown in FIG. 6 are omitted, and instead the resistor R3 is connected directly to the inverting input terminal of the operational amplifier OP1 and the resistor R4 is connected directly to the output terminal of the operational amplifier OP1. Correspondingly, it is advisable to use a selecting circuit in which the inverter circuit 73 used in the selecting circuit shown in FIG. 5 is omitted. This helps achieve a simpler circuit configuration than in FIG. 6.

Figure 8:
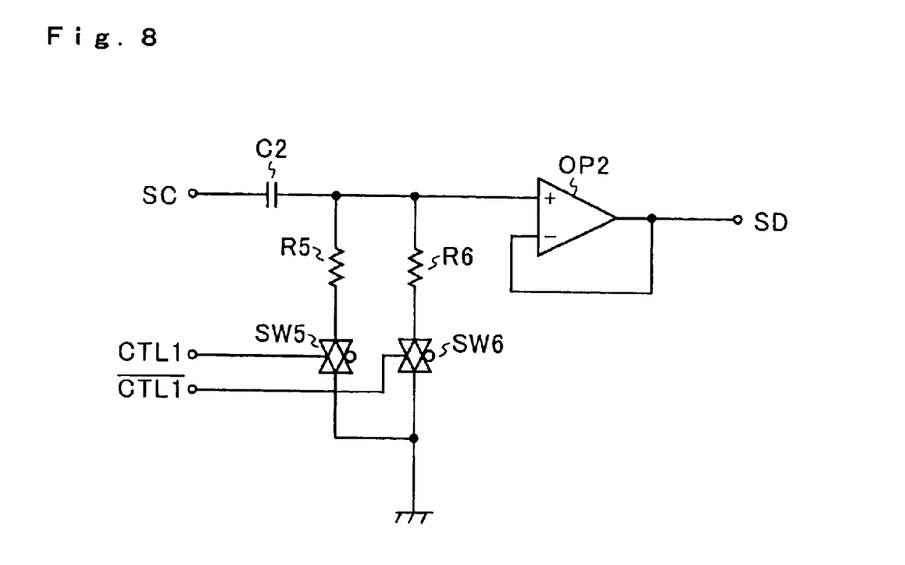
FIG. 8 is a diagram showing another example of the configuration of the differentiating circuit provided in the motor rotation rate detecting circuit of FIG. 1.

Next, the configuration of the differentiating circuit shown in FIG. 8 will be described. The differentiating circuit shown in FIG. 8 is composed of a capacitor C2, resistors R5 and R6, analog switches SW5 and SW6, and an operational amplifier OP2. One end of the capacitor C2 serves as the input end of the differentiating circuit. The other end of the capacitor C2 is connected to one end of the resistor R5, to one end of the resistor R6, and to the non-inverting input terminal of the operational amplifier OP2. The other end of the resistor R5 is grounded through the analog switch SW5, and the other end of the resistor R6 is grounded through the analog switch SW6. The analog switch SW5 is controlled by the control signal CTL1 (see FIG. 5) output from the selecting circuit 7, and the analog switch SW6 is controlled by the control signal CTL1 overscored (see FIG. 5) output from the selecting circuit 7. The inverting input terminal and output terminal of the operational amplifier OP2 are connected together directly, and the node at which they are connected together serves as the output end of the differentiating circuit.

Figure 9:
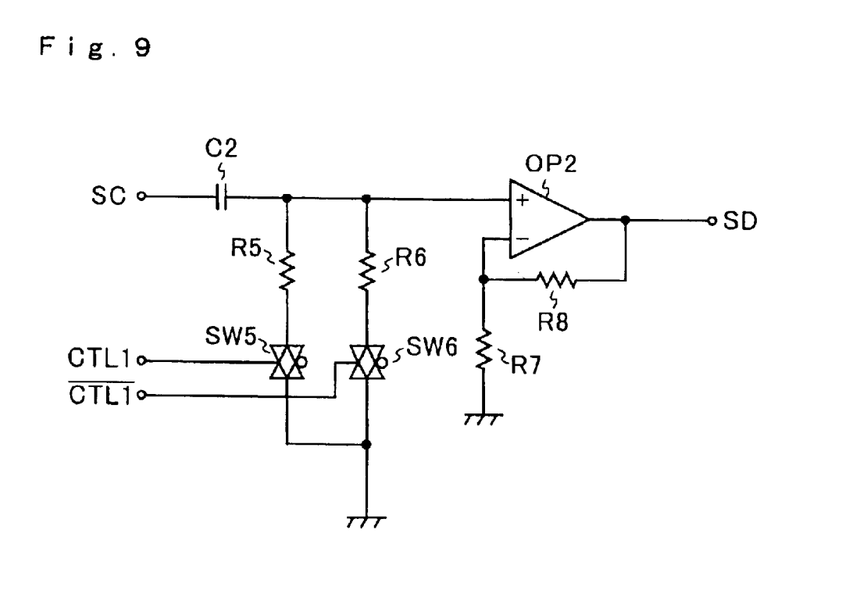
FIG. 9 is a diagram showing another example of the configuration of the differentiating circuit provided in the motor rotation rate detecting circuit of FIG. 1.

Next, the configuration of the differentiating circuit shown in FIG. 9 will be described. Here, such circuit elements as are found also in the differentiating circuit shown in FIG. 8 are identified with the same reference numerals and symbols, and their detailed explanations will not be repeated. In the differentiating circuit shown in FIG. 9, the differentiating circuit shown in FIG. 8 is further provided with resistors R7 and R8. Here, the inverting input terminal of the operational amplifier OP2 is grounded through the resistor R7. Moreover, the inverting input terminal and output terminal of the operational amplifier OP2 are connected together not directly but through the resistor R8, and the node at which the output terminal of the operational amplifier OP2 and the resistor R8 are connected together serves as the output end of the differentiating circuit. This makes it possible to obtain a higher gain and thereby achieve sure detection even when the error component is small.

Figure 10:
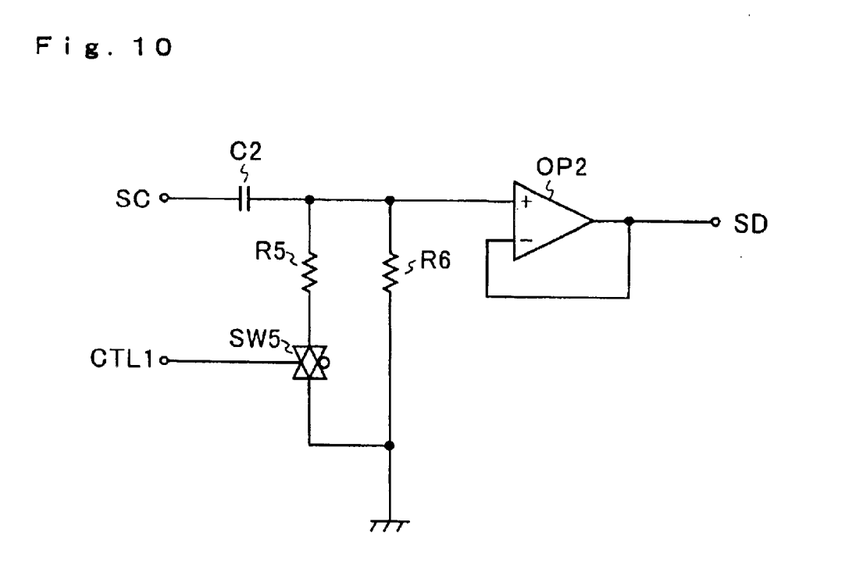
FIG. 10 is a diagram showing another example of the configuration of the differentiating circuit provided in the motor rotation rate detecting circuit of FIG. 1.

Next, the configuration of the differentiating circuit shown in FIG. 10 will be described. Here, such circuit elements as are found also in the differentiating circuit shown in FIG. 8 are identified with the same reference numerals and symbols, and their detailed explanations will not be repeated. In the differentiating circuit shown in FIG. 10, the analog switch SW6 used in the differentiating circuit shown in FIG. 8 is omitted, and instead the resistor R6 is grounded directly. Correspondingly, it is advisable to use a selecting circuit in which the inverter circuit 73 used in the selecting circuit shown in FIG. 5 is omitted.

Figure 11:
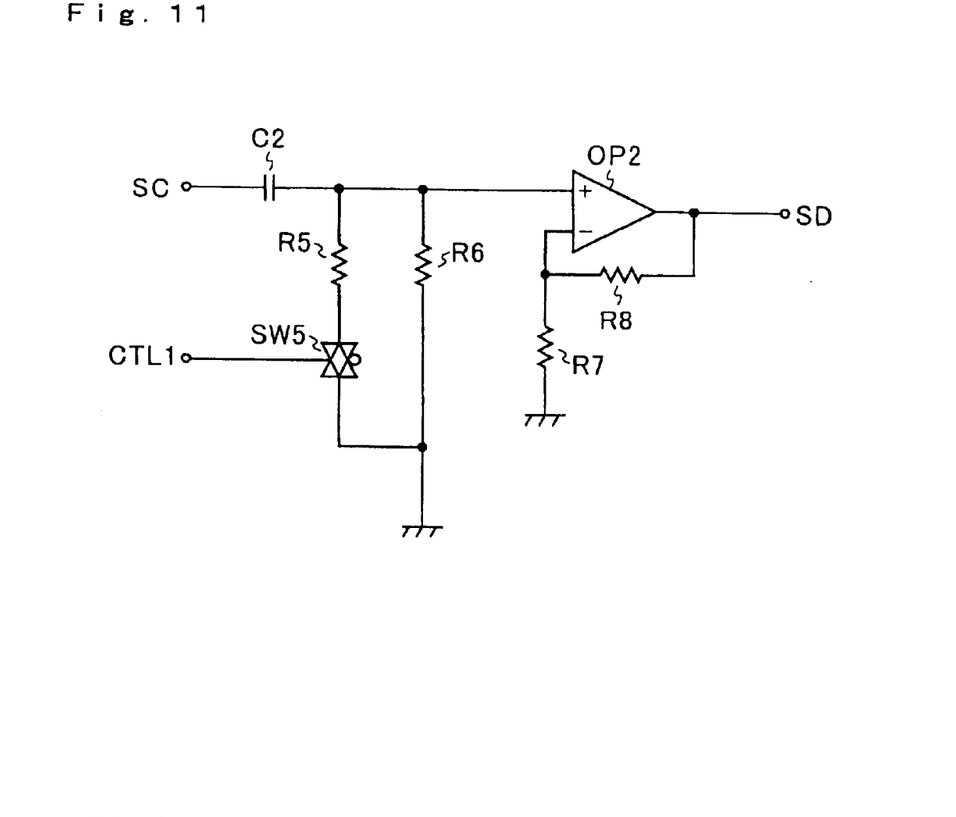
FIG. 11 is a diagram showing another example of the configuration of the differentiating circuit provided in the motor rotation rate detecting circuit of FIG. 1.

Next, the configuration of the differentiating circuit shown in FIG. 11 will be described. Here, such circuit elements as are found also in the differentiating circuit shown in FIG. 9 are identified with the same reference numerals and symbols, and their detailed explanations will not be repeated. In the differentiating circuit shown in FIG. 11, the analog switch SW6 used in the differentiating circuit shown in FIG. 9 is omitted, and instead the resistor R6 is grounded directly. Correspondingly, it is advisable to use a selecting circuit in which the inverter circuit 73 used in the selecting circuit shown in FIG. 5 is omitted.

The embodiment described above deals with a case in which a differentiating circuit is used that switches the maximum value of the differentiating operation frequency in two steps by switching analog switches. It is also possible, however, to use a differentiating circuit that switches the maximum value of the differentiating operation frequency in three or more steps.

A motor rotation rate detecting circuit embodying the present invention may be configured in any other manner than shown in FIG. 1. For example, it may be configured like the motor rotation rate detecting circuit disclosed in Japanese Patent Application Laid-Open No. S57-76456, provided that its differentiating circuit is so configured as to permit the maximum value of the differentiating operation frequency to be switched in a plurality of steps and that a selecting circuit for controlling the switches provided in that differentiating circuit is additionally provided. The voltage of the rotation rate detection signal SE may be detected in a plurality of steps, with the switches provided in the differentiating circuit so configured as to offer the maximum value of the differentiating operation frequency in a plurality of steps. In the embodiment described above, the control signal CTL1 overscored is produced within the selecting circuit. It is also possible, however, to produce the control signal CTL1 overscored, whenever it is necessary, within the differentiating circuit by inverting the control signal CTL1.

In the embodiment described above, the signals output from the encoder coupled to the motor are sinusoidal signals. However, the signals output from the encoder coupled to the motor may be signals having alternating waveforms of any other type so long as, by differentiating them, it is possible to extract a component that indicates the motor rotation rate.

In any of the differentiating circuits shown in FIGS. 8 to 11, the analog switches SW5 and SW6 may be replaced with switching circuits using transistors. For example, it is possible to provide, instead of the analog switch SW5, an n-channel MOSFET that has its drain connected to the resistor R5, that has its source connected to ground, and that receives at its gate the control signal CTL1, and provide, instead of the analog switch SW6, an n-channel MOSFET that has its drain connected to the resistor R6, that has its source connected to ground, and that receives at its gate the control signal CTL1 overscored.

A motor driving device embodying the present invention is provided with a motor rotation rate detecting circuit as described above and a motor. A motor driving device embodying the present invention includes a motor and a motor rotation rate detecting circuit that produces a rotation rate detection signal by differentiating a plurality of alternating signals having different phases that are output according to the rotation position of the motor. Here, the frequency response of the differentiating operation of the differentiating circuit provided in the motor rotation rate detecting circuit is switched according to the voltage of the rotation rate detection signal. As a result, it is possible to make the maximum value of the differentiating operation frequency small when the motor is rotating at a low rate and thereby prevent the differentiating circuit from amplifying high-frequency noise when the motor is rotating at a low rate. On the other hand, it is possible to make the maximum value of the differentiating operation frequency great when the motor is rotating at a high rate and thereby achieve sure detection of the motor rotation rate even when the motor is rotating at a high rate. In this way, it is possible to realize a motor driving device incorporating a motor rotation rate detecting circuit that is capable of wide-range detection with satisfactory resistance to high-frequency noise over the entire range.

In an optical disk apparatus, as the disk rotation rate becomes increasingly high, the range of the frequency of the output signal of the encoder coupled to the spindle motor becomes increasingly wide. Thus, a motor driving device embodying the present invention is suitable as a motor driving device for driving a spindle motor in an optical disk apparatus.

Motor driving devices embodying the present invention find application not only in optical disk apparatuses but in electric appliances of any kind provided with a motor wherein the range of the rotation rate of the motor is wide and the rotation rate of the motor needs to be controlled.

What is claimed is:

1. A motor rotation rate detecting circuit comprising:
    a differentiating circuit,
    wherein said differentiating circuit produces a rotation rate detection signal by differentiating a plurality of alternating signals having different phases that are output according to a rotation position of a motor, and
    wherein a frequency response of differentiating operation of said differentiating circuit is switchable according to a voltage of said rotation rate detection signal.

2. A motor rotation rate detecting circuit as claimed in claim 1, further comprising:
    a selecting circuit,
    wherein said selecting circuit switches the frequency response of the differentiating operation of said differentiating circuit according to the voltage of said rotation rate detection signal.

3. A motor rotation rate detecting circuit as claimed in claim 2,
    wherein said differentiating circuit includes a capacitor, at least two resistors, at least one switch, and an operational amplifier,
    wherein said selecting circuit switches the frequency response of the differentiating operation of said differentiating circuit by turning on and off said at least one switch according to the voltage of said rotation rate detection signal.

4. A motor rotation rate detecting circuit as claimed in claim 1,
    wherein said differentiating circuit has a constant alternating-current gain irrespective of the frequency response of the differentiating operation thereof.

5. A motor rotation rate detecting circuit as claimed in claim 2,
    wherein said differentiating circuit has a constant alternating-current gain irrespective of the frequency response of the differentiating operation thereof.

6. A motor rotation rate detecting circuit as claimed in claim 3,
    wherein said differentiating circuit has a constant alternating-current gain irrespective of the frequency response of the differentiating operation thereof.

7. A motor driving device comprising:
    a motor; and
    a motor rotation rate detecting circuit,
    wherein said motor rotation rate detecting circuit includes a differentiating circuit that produces a rotation rate detection signal by differentiating a plurality of alternating signals having different phases that are output according to a rotation position of said motor, and
    wherein a frequency response of differentiating operation of said differentiating circuit is switchable according to a voltage of said rotation rate detection signal.

8. A motor driving device as claimed in claim 7,
    wherein said motor rotation rate detecting circuit further includes a selecting circuit, and
    wherein said selecting circuit switches the frequency response of the differentiating operation of said differentiating circuit according to the voltage of said rotation rate detection signal.

9. A motor driving device as claimed in claim 8,
    wherein said differentiating circuit includes a capacitor, at least two resistors, at least one switch, and an operational amplifier,
    wherein said selecting circuit switches the frequency response of the differentiating operation of said differentiating circuit by turning on and off said at least one switch according to the voltage of said rotation rate detection signal.

10. A motor driving device as claimed in claim 7,
    wherein said differentiating circuit has a constant alternating-current gain irrespective of the frequency response of the differentiating operation thereof.

11. A motor driving device as claimed in claim 8,
    wherein said differentiating circuit has a constant alternating-current gain irrespective of the frequency response of the differentiating operation thereof.

12. A motor driving device as claimed in claim 9,
    wherein said differentiating circuit has a constant alternating-current gain irrespective of the frequency response of the differentiating operation thereof.

13. A motor driving device as claimed in claim 7,
    wherein said motor driving device is an optical disk apparatus, and said motor is a spindle motor.

14. A motor driving device as claimed in claim 8,
    wherein said motor driving device is an optical disk apparatus, and said motor is a spindle motor.

15. A motor driving device as claimed in claim 9,
    wherein said motor driving device is an optical disk apparatus, and said motor is a spindle motor.

16. A motor driving device as claimed in claim 10,
    wherein said motor driving device is an optical disk apparatus, and said motor is a spindle motor.

17. A motor driving device as claimed in claim 11,
    wherein said motor driving device is an optical disk apparatus, and said motor is a spindle motor.

18. A motor driving device as claimed in claim 12,
    wherein said motor driving device is an optical disk apparatus, and said motor is a spindle motor.

* * * * *